United States Patent
Handler

(10) Patent No.: US 8,978,130 B2
(45) Date of Patent: Mar. 10, 2015

(54) METHOD AND SYSTEM FOR CHILD AUTHENTICATION

(75) Inventor: Bradley A Handler, Palo Alto, CA (US)

(73) Assignee: Technology Policy Associates, LLC, Palo Alto, CA (US)

( * ) Notice: Subject to any disclaimer, the term of this patent is extended or adjusted under 35 U.S.C. 154(b) by 1248 days.

(21) Appl. No.: 12/536,244

(22) Filed: Aug. 5, 2009

(65) Prior Publication Data

US 2011/0035799 A1 Feb. 10, 2011

(51) Int. Cl.
*G11C 7/04* (2006.01)
*G06F 21/60* (2013.01)

(52) U.S. Cl.
CPC ...... *G06F 21/606* (2013.01); *G06F 2221/2149* (2013.01)
USPC .......................................................... 726/21

(58) Field of Classification Search
USPC .......................................................... 726/21
See application file for complete search history.

(56) References Cited

U.S. PATENT DOCUMENTS

| | | | | |
|---|---|---|---|---|
| 7,827,247 | B1 * | 11/2010 | Spertus et al. | 709/206 |
| 7,860,936 | B1 * | 12/2010 | Newstadt et al. | 709/206 |
| 7,996,463 | B2 * | 8/2011 | Mousseau et al. | 709/204 |
| 8,161,105 | B2 * | 4/2012 | Mousseau et al. | 709/203 |
| 8,583,729 | B2 * | 11/2013 | Mousseau et al. | 709/203 |
| 2006/0010200 | A1 * | 1/2006 | Mousseau et al. | 709/204 |
| 2009/0157816 | A1 * | 6/2009 | Pattan | 709/206 |
| 2012/0159168 | A1 * | 6/2012 | Castro et al. | 713/168 |

* cited by examiner

*Primary Examiner* — Teshome Hailu
(74) *Attorney, Agent, or Firm* — Schwegman Lundberg & Woessner, P.A.

(57) ABSTRACT

Methods and systems for child authentication are described. In one embodiment, a communication enablement request may be received to enable electronic communications between a first child and a second child. A confirmation acceptance code may be electronically generated. The confirmation acceptance code may be associated with the first child and the second child. The confirmation acceptance code may be received from a parental representative of the second child. The electronic communication may be enabled between the first child and the second child based on the receiving of the confirmation acceptance code from the parental representative of the second child. Additional methods and systems are disclosed.

22 Claims, 8 Drawing Sheets

METHOD AND SYSTEM FOR CHILD AUTHENTICATION

TECHNICAL FIELD

This application relates to methods and systems for authentication of an end-user and, more specifically, to methods and systems for authenticating children to electronically communicate with others.

BACKGROUND

Many parents (or other types of parental representatives) are concerned about the people with whom their children communicate. When the children communicate over a network using communication devices including mobile phones and personal computers, parents may identify some of the their children's potential or actual communication participants as being unknown, untrustworthy, or otherwise unacceptable. In response, parents may restrict availability of the communication devices to their children to prevent their children from communicating with such people.

Various systems and methods are known that attempt to limit electronic communications for children. For example, one system describes a personal messaging proxy to manage and configure instant messaging and presence services. The proxy can be implemented as either a single software entity or a distributed software entity and contains a set of parentally-controlled subscription filter rules and content filter rules. When the child participates in instant messaging sessions with other users, the proxy can be configured to forward all messages or selected messages to a monitoring parent's device to periodically monitor the instant messaging behavior of the child.

Another system allows a parent to log onto a parental control server. The parent identifies himself or herself to the parental control server by providing identification information, such as a username and a password. The parent can then access a setting database that includes an allow/block list including a list of parentally controlled actions. The allow/block list includes an allow-list of actions allowed by the parent and a block-list of the actions blocked by the parent. Thus, the allow/block list includes customized parental controls.

Still another system requires a parent or guardian of a child to allow the child access to instant messaging devices. One or more authentication credentials are received from the parent or guardian to establish the age of the parent or guardian. The authentication can come from existing third part services, driver's license numbers, or that the parent or guardian is in possession of a valid credit card number. Alternatively, a child can log onto a system directly provided one of the age authentication means stated above are present.

Yet another system provides message filtering for allowing a supervisory user, such as a parent, to control a flow of messages to other users, such as a child. E-mail messages or instant messages from already-approved senders are allowed to pass directly to the child's account. Messages from unapproved senders are forwarded to the parent's account for either deletion or approval to forward to the child.

DETAILED DESCRIPTION

Figure 1:
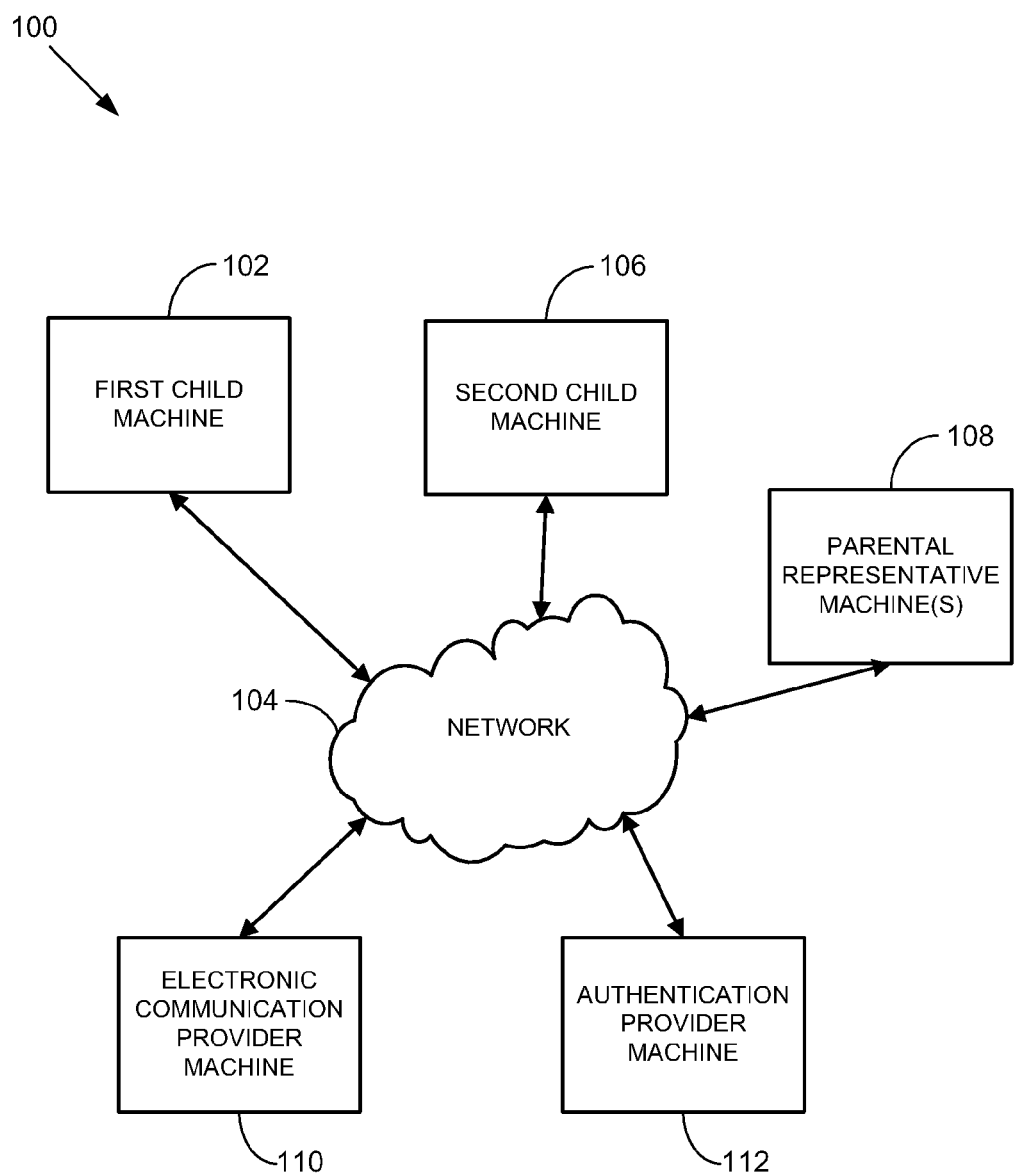
FIG. 1 is a block diagram of a system where children seek to communicate electronically, according to an exemplary embodiment.

The description that follows includes illustrative structures, methods, materials, and techniques that embody the present disclosure. In the following description, for purposes of explanation, numerous specific details are set forth to provide an understanding of various embodiments of the inventive subject matter. It will be evident, however, to those skilled in the art that embodiments of the inventive subject matter may be practiced without these specific details. Further, well-known structures, protocols, Internet-based practices, and techniques have not been shown in detail.

As used herein, the term "or" may be construed in an inclusive or exclusive sense. Similarly, the term "exemplary" may be construed merely to mean an example of something or an exemplar and not necessarily a preferred means of accomplishing a goal. Additionally, although various exemplary embodiments discussed below focus on various embodiments related to authentication for a child communicating in an electronic environment, the embodiments are merely given for clarity in disclosure. Thus, any type of electronic communications in which an authorized representative approves communication for a dependent, is considered as being within a scope of the present disclosure.

Exemplary methods and systems for child authentication are described. A child can be defined as any minor (i.e., less the age of majority in a given jurisdiction). Alternatively, the child may be under a certain age, such as 8, 12, or 16. Generally, the child is defined as being of any age for which a parent might wish to limit electronic communications with others. In the following description, for purposes of explanation, numerous specific details are set forth in order to transmit a thorough understanding of exemplary embodiments. It will be evident, however, to one of ordinary skill in the art that embodiments of the invention may be practiced without these specific details.

A child that seeks to electronically communicate with others in a system cannot automatically do so. Rather, the child seeks authorization from a parental representative to communicate. An electronically generated confirmation code that would enable the child to communicate is provided to the parental representative. The code may be provided by the child to the parental representative in hard copy, or may be transmitted electronically to the parental representative. When the confirmation code is submitted by the parental representative to an electronic communication provider machine, an authentication provider machine or both, one or more types of electronic communication are authorized for the child to communicate with one or more specified communication participants.

The authorization by the parental representative does not universally allow the child to communicate with all possible communication participants in the system. Rather, the authorization is specific to one or more other children or other communication participants of whom the parental representative approves. The authorization may be provided for all different types of electronic communication, or for one or more specific types of communication.

FIG. 1 illustrates an exemplary system 100 in which children seek to communicate electronically with other communication participants over a network 104 through use of a first child machine 102 and a second child machine 106. When communication participants are approved by a parent or other type of parental representative, electronic communications are transmitted from one child machine to another over the network 104 through use of an electronic communication provider machine 110. The electronic communication provider machine 110 enables children and other communication participants that have been approved to communicate with one another. For example, instant messaging, text messaging, site messaging website content access, blog content access, or user status information may be transmitted between a first child machine 102 and a second child machine 106 once authorized.

The child machines 102, 106 are electronic devices that enable the children to electronically communicate with others. Examples of the child machines 102, 106 include a set-top box (STB), a gaming unit, a receiver card, a mobile phone, a personal digital assistant (PDA), a display device, a generic computing system, or the like. Other devices may also be used. The child machines 102, 106 may be different device types.

The type of the network 104 over which the child machines 102, 106 electronically communicate may include a Global System for Mobile Communications (GSM) network, an Internet Protocol (IP) network, a Wireless Application Protocol (WAP) network, a Wi-Fi network, or an IEEE 802.11-based standards network, as well as various combinations thereof. Other conventional or later developed wired and wireless networks may also be used.

The parental representative machines 108, when included in the system 100, are operated by the parental representatives of the children and are used to authorize electronic communications between the children. In other embodiments, one or more of the parental representatives of a first child and a second child share a single machine.

The electronic communication provider machine 110 that facilitates electronic communication for a child when authorized by a parental representative is a computing system operated by an electronic communication provider. The electronic communications are received by the electronic communication provider machine 110 from one of the child machines 102, 106 and then provided to the other. While only two child machines 102, 106 are shown in the system 100, many more child machines may also be included.

The authentication of the electronic communication is performed by the electronic communication provider machine 110 or by an authentication provider machine 112. When the authentication is performed by the authentication provider machine 112, the authentication is then sent to the electronic communication provider machine 110 to enable the electronic communication.

Figure 2:
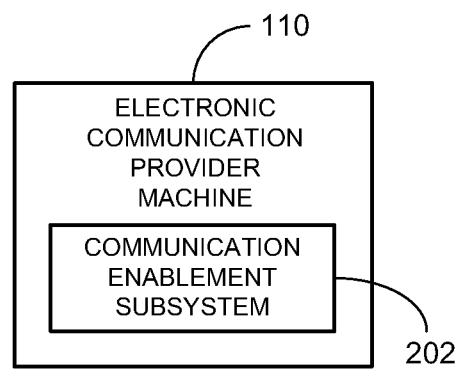
FIG. 2 is a block diagram of an electronic communication provider machine that may be deployed within the system of FIG. 1, according to an exemplary embodiment.

FIG. 2 illustrates an exemplary electronic communication provider machine 110 that is deployed in the system 100 (see FIG. 1), or may otherwise be deployed in another system. The electronic communication provider machine 110 includes a communication enablement subsystem 202 to enable and process electronic communications for a child. Communications are enabled by the communication enablement subsystem 202 when one or more parental representatives of the children provide authorization for their child to communicate with one or more other children or other communication participants). Otherwise, the child is not permitted to electronically communicate with unapproved communication participants.

Figure 3:
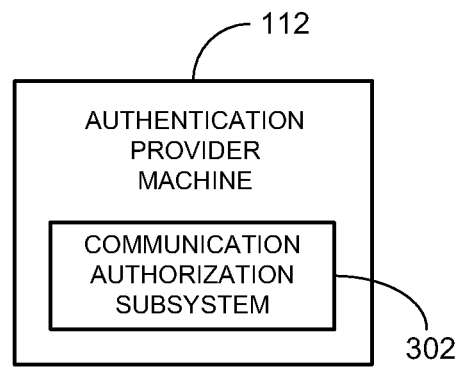
FIG. 3 is a block diagram of an authentication provider machine that may be deployed within the system of FIG. 1, according to an exemplary embodiment.

FIG. 3 illustrates an exemplary authentication provider machine 112 that is deployed in the system 100 (see FIG. 1), or otherwise deployed in another system. The authentication provider machine 112 includes a communication authorization subsystem 302 to enable electronic communications for a child and provides the authentication to the electronic communication provider machine 110. In some embodiments, the authentication provider machine 112 is used to provide the authentication to the electronic communication provider machine 110 when the communication enablement subsystem 202 is not deployed within the electronic communication provider machine 110. In other embodiments, the authentication provider machine 112 is used to provide the authentication to the electronic communication provider machine 110 and other electronic communication providers in other systems.

Figure 4:
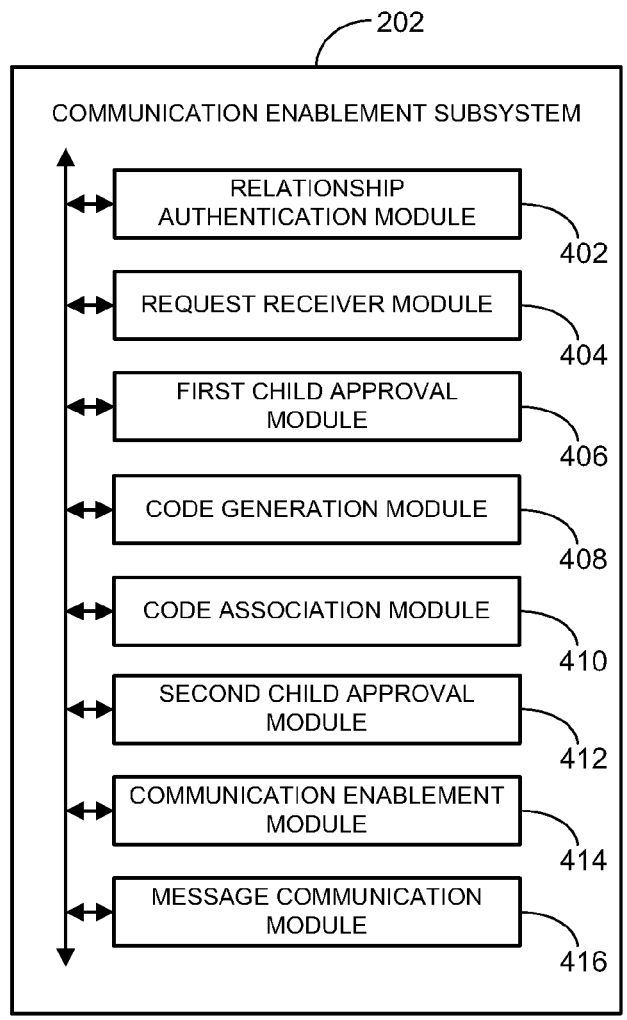
FIG. 4 is a block diagram of a communication enablement subsystem that may be deployed within the electronic communication provider machine of FIG. 2, according to an exemplary embodiment.

FIG. 4 illustrates an exemplary communication enablement subsystem 202 (see FIG. 2) that may be deployed in the electronic communication provider machine 110 of the system 100 (see FIG. 1), or otherwise deployed in another system (not shown). The communication enablement subsystem 202 processes a communications enablement request and determines whether to enable electronic communications between the children. To perform the determination and processing, the communication enablement subsystem 202 includes a relationship authentication module 402, a request receiver module 404, a first child approval module 406, a code generation module 408, a code association module 410, a second child approval module 412, a communication enablement module 414, or a message communication module 416. Other modules may also be included. In various embodiments, the modules may be distributed so that some of the modules may be deployed in the electronic communication provider machine 110 and some of the modules may be deployed in one or more of the child machines 102, 106.

In general, a first child seeks to initiate electronic communication with a second child, the second child seeks to receive electronic communications from the first child, or both. Electronic communications include instant messaging, text messaging, website content access, blog content access, user status information, or the like. The electronic communication provider machine 110 will not, however, allow the electronic communication to occur (or of a certain type to occur) between the children until determining that at least the parental representative of the second child has approved the electronic communication between the children.

In some embodiments, a relationship between the second child and the parental representative of the second child may be authenticated by the relationship authentication module 402. The authentication confirms that the parental representative is able to act on behalf of the second child. In one particular embodiment, the authentication is in accordance with Children's Online Privacy Protection Act (COPPA). The authentication provides a level of assurance to the authenticator (e.g., the electronic communication provider machine 110 or the authentication provider machine 112) that the parental representative is authorized to act on behalf of the second child. Without such assurance, the authenticator could receive authorization from a friend of the second child, an unauthorized adult, or a different type of person that does not have parental authority over the second child.

Upon receipt of a communication enablement request by the request receiver module 404, a determination of whether to enable the electronic communications between the first child and the second child is initiated. The request is received from the parental representative of the first child, the parental representative of the second child, the first child, or the second child.

In some embodiments, the communication enablement request includes a name of the second child. The communication enablement request, in some embodiments, includes identification of one or more types of electronic communication to be allowed between the first child and the second child. For example, the communication enable request may request that instant messaging (IM) communications be enabled with the first child.

In some embodiments, a first child request is transmitted by the first child approval module 406 to the parental representative machines 108 of the first child. The first child request is sent to the parental representative of the first child to seek approval for the first child to electronically communicate with the second child. If approved by the parental representative of the first child, the first child approval module 406 receives first child approval from the parental representative machines 108 of the first child. First child approval may be received from the parental representative of the first child in other ways.

As part of the determination of whether to enable electronic communications between the first child and the second child, a confirmation acceptance code and, in some embodiments, an additional confirmation acceptance code, are electronically generated by the code generation module 408. Once generated, the confirmation acceptance code is then associated with the first child and the second child by the code association module 410. The association enables the parental representative to specifically authorize electronic communication between the first child and the second child without authorizing communication with other possible communication participants.

The confirmation acceptance codes are used by the communication enablement subsystem 202 to confirm that parental representatives have approved that their children may electronically communicate with another child. The confirmation of acceptance codes may include human readable characters, non-human readable characters, or both.

To approve the electronic communication, the confirmation acceptance code is received from the parental representative of the second child by the second child approval module 412. In one embodiment, the confirmation acceptance code is transmitted to the second child. The second child then provides (e.g., in hard copy or transmitted electronically) the confirmation acceptance code to the parental representative, who then provides the confirmation acceptance code to the second child approval module 412. In another embodiment, the confirmation acceptance request is transmitted or otherwise provided to the parental representative of the second child.

Once the confirmation acceptance code is received from the parental representative of the first child, the parental representative of the second child, or both, the communication enablement module 414 enables the electronic communication between the first child and the second child. The communication enablement module 414 may, in one embodiment, transmit an electronic communication notification to an additional electronic communication provider. The electronic communication notification may then be used by the additional electronic communication provider to enable electronic communication between the first child and the second child. In other embodiments, the communication enablement module 414 allows the first child to see content posted by the second child, the second child to see content posted by the first child, or both.

After electronic communication has been enabled by the communication enablement module 414, the message communication module 416 receives messages from the first child, verifies that the electronic communication has been enabled between the first child and the second child, and transmits the messages to the second child. In some embodiments, the message communication module 416 also receives messages for the first child from the second child, verifies that the electronic communication has been enabled between the first child and the second child, and transmits the messages to the first child.

In some embodiments, the communication enablement subsystem 202 prevents electronic communication when not approved by parental representatives of the children. The prevention may reduce the risk of children communicating with persons that are unknown to either or both of the parental representatives.

Figure 5:
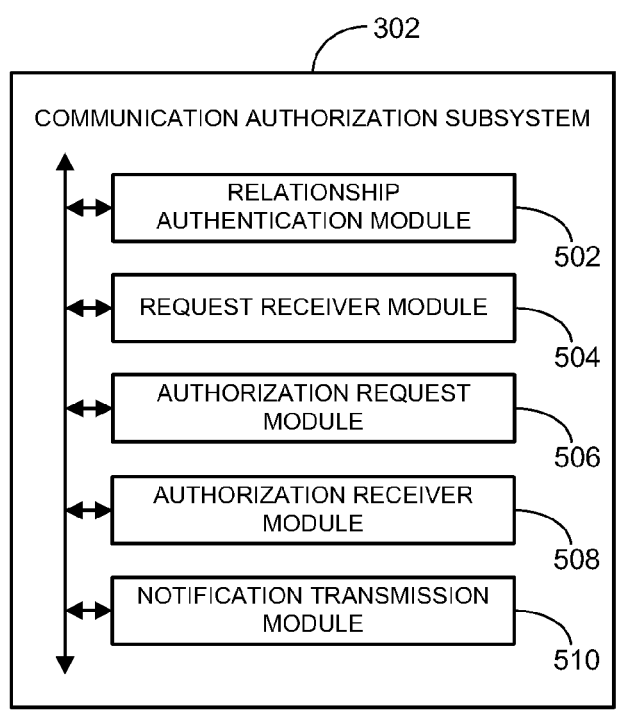
FIG. 5 is a block diagram of a communication authorization subsystem that may be deployed within the authentication provider machine of FIG. 3, according to an exemplary embodiment.

FIG. 5 illustrates an exemplary communication authorization subsystem 302 that is deployed in the authentication provider machine 112 of the system 100 (see FIG. 1), or otherwise deployed in another system. The communication authorization subsystem 302 includes a relationship authentication module 502, a request receiver module 504, an authorization request module 506, an authorization receiver module 508, or a notification transmission module 510. Other modules may also be included. In various embodiments, the modules may be distributed so that some of the modules may be deployed in the authentication provider machine 112 and some of the modules may be deployed in one or more of the child machines 102, 106.

In some embodiments, a relationship between the child and the parental representative of the child is first authenticated by the relationship authentication module 502. The relationship may be authenticated by the parent providing confirming information (e.g., name, age, birth date, etc.) about the child, verifying that the child and parental representative reside at the same address, or may otherwise be authenticated.

The communications enablement request is received by the request receiver module 504 to enable electronic communication between the child and a communication participant. The communication participant may be a child, or a person that is older than a child. In general, a person is deemed to be a child for whom parental authorization is sought when he or she is below 13 years of age (e.g., between 8 and 12 years old). However, the age may be higher (e.g., age 18) or lower (e.g., age 7) as desired by an operator of the authentication provider machine 112 (see FIG. 1), other person, or other entity.

Once the communications enablement request is received by the request receiver module 504, the authorization request module 506 requests authorization from the parental representative to authorize electronic communication between the child and the communication participant.

If the parental representative chooses to authorize the electronic communication, authorization is received by the authorization receiver module 508 from the parental representative of the child to electronically communicate with the communication participant. In some embodiments, the authorization receiver module 508 receives one or more communication permission attributes from the parental representative for the child. The communication permission attribute defines an attribute of the electronic communication to be enabled. For example, a certain number of messages may be allowed (e.g., in total or during a period of time), a certain type of messages may be allowed, a certain source of messages may be allowed, and the like. The attributes may be included in the authorization, or may be received separately from the authorization.

After the electronic communication has been authorized, the notification transmission module 510 transmits an authorization notification for electronic communication between the child and the communication participant to the electronic communication provider machine 110. The electronic communication provider machine 110 may then enable electronic communications between the child and the communication participant.

Figure 6:
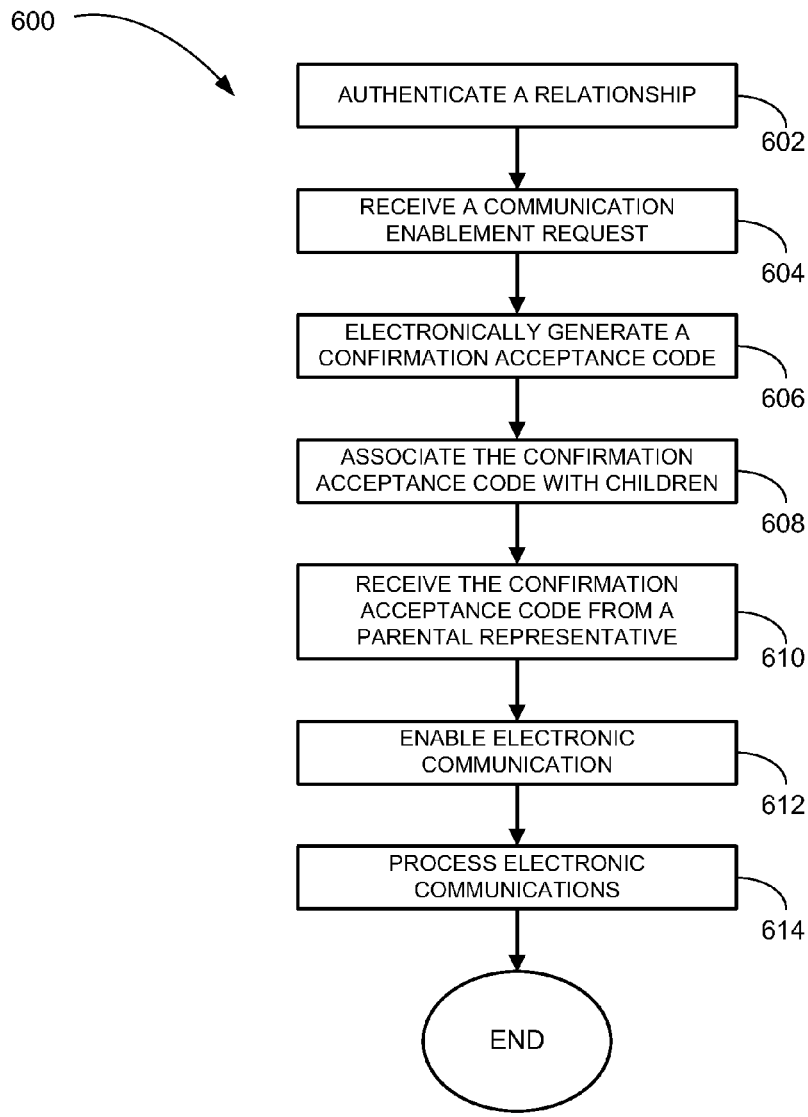
FIG. 6 is a block diagram of a flowchart illustrating a method for communication enablement, according to an exemplary embodiment.

FIG. 6 illustrates a method 600 for communication enablement, according to an exemplary embodiment. The method 600 may be performed by the first child machine 102 or the electronic communication provider machine 110 of the system 100 (see FIG. 1), or may otherwise be performed.

In some embodiments, the relationship between the second child and the parental representative of the second child is authenticated at operation 602. The parental representative may be a parent, a grandparent, a step-parent, a guardian, or the like. In one embodiment, the authentication is performed in accordance with COPPA, as noted above. For example, a parental representative registers for access with the electronic communication provider machine 110 using a credit card. A relationship between the second child and the parental representative is then authorized and the second child receives child user identification for communication access. In some embodiments, the parental representative receives parent use identification access for approving communication access for the second child. The parental representative may have a different email address from the second child, or may have a facsimile number to enable the receipt of messages for the parental representative.

The communication enablement request is received at operation 604 to enable electronic communications between the first child and the second child. The communications enablement request may include a name of the second child, identification of one or more types of electronic communication to be allowed between the first child and the second child, or both. The electronic communications may include, by way of example, instant messaging, text messaging, website content access, blog content access, user status information, or the like.

In one embodiment, the communications enablement request is received from the parental representative of the first child. In another embodiment, the communications enablement request is received from the first child, the second child, or both the first child and the second child.

The confirmation acceptance code is electronically generated at operation 606. In some embodiments, the confirmation acceptance code is a unique identifier. In other embodiments, the confirmation acceptance code is a substantially unique identifier that is valid for a limited period of time. Other types of confirmation acceptance codes may also be electronically generated.

In one embodiment, a first child request is provided to the parental representative of the first child in response to the receiving of the communications enablement request, the first child approval is received from the parental representative of the first child, and the generation of the confirmation acceptance code is in response to receipt of the first child approval.

After the confirmation acceptance code is electronically generated, the confirmation acceptance code is associated with the first child and the second child at operation 608.

The confirmation acceptance code is then provided directly or indirectly to the parental representative of the second child and ultimately received back from the parental representative of the second child at operation 610. In one embodiment, the confirmation acceptance code is received in response to transmitting a confirmation acceptance request to the parental representative of the second child. In another embodiment, the confirmation acceptance request is first provided to the second child. The second child then transmits the confirmation acceptance request to the parental representative of the second child. The confirmation acceptance code is then received from the parental representative. The confirmation acceptance code may be provided in hard copy, electronically, audibly, or may otherwise be provided.

The electronic communication between the first child and the second child is enabled at operation 612. In one embodiment, the electronic communication is enabled by transmitting an electronic communication notification from a child machine or parental representative machine to the electronic communication provider machine 110 (see FIG. 1). The electronic communication notification includes identification of the first child and the second child. In another embodiment, the electronic communication is enabled after an additional confirmation acceptance code is generated in response to receipt of the confirmation acceptance code from the parental representative and the additional confirmation acceptance code is then received from the parental representative of the first child.

After electronic communication has been enabled, one or more electronic communications between the first child and the second child may be processed at operation 614. For example, when a message is provided from the first child for the second child, verification that the electronic communication has been enabled between the first child and the second child is made and the message is then provided to the second child. Similarly, when a message is provided from the second child for the first child, verification that the electronic communication has been enabled between the first child and the second child is made and the message is then provided to the first child.

Figure 7:
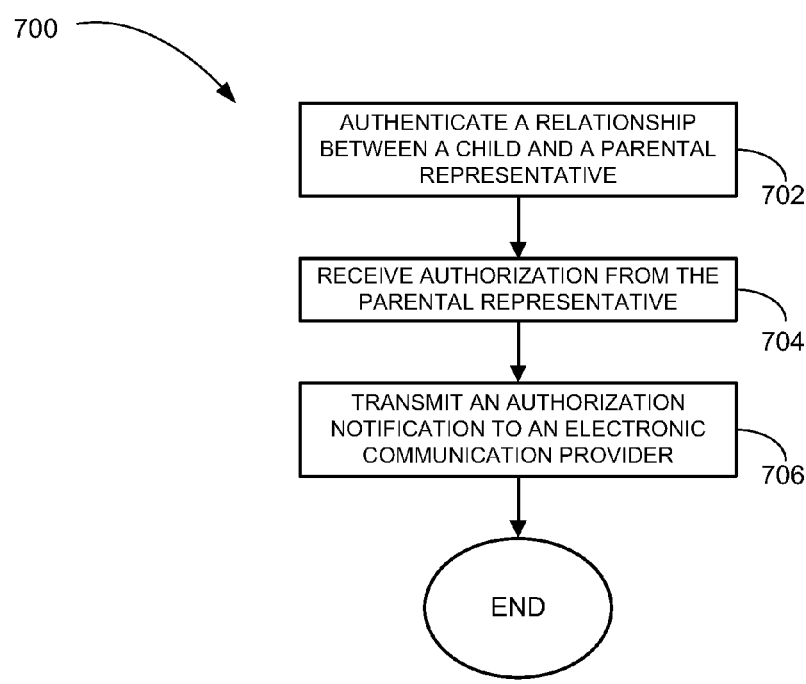
FIG. 7 is a block diagram of a flowchart illustrating a method for communication authorization, according to an exemplary embodiment.

FIG. 7 illustrates a method 700 for communication authorization, according to an exemplary embodiment. The method 700 may be performed by the first child machine 102 or the authentication provider machine 112 of the system 100 (see FIG. 1), or may otherwise be performed.

A relationship is authenticated between a child and a parental representative at operation 702. In one embodiment, the authentication of the relationship between the child and the parental representative may be in accordance with COPPA, as noted above.

Authorization is received from the parental representative for the child to electronically communicate with a communication participant at operation 704. In one embodiment, a communication enablement request to enable the electronic communications between the child and the communication participant is received and authorization from the parental representative is requested. The authorization is then received in response to the request of the authorization.

In one embodiment, one or more communication permission attributes are also received from the parental representative for the child. A communication permission attribute defines an attribute of the electronic communication to be enabled. Exemplary attributes include a number of messages, a message type, an attachment type, an electronic communication type, or the like.

An authorization notification for electronic communications between the child and the communication participant is then transmitted to the electronic communication provider machine 110 (see FIG. 1) at operation 706.

Figure 8:
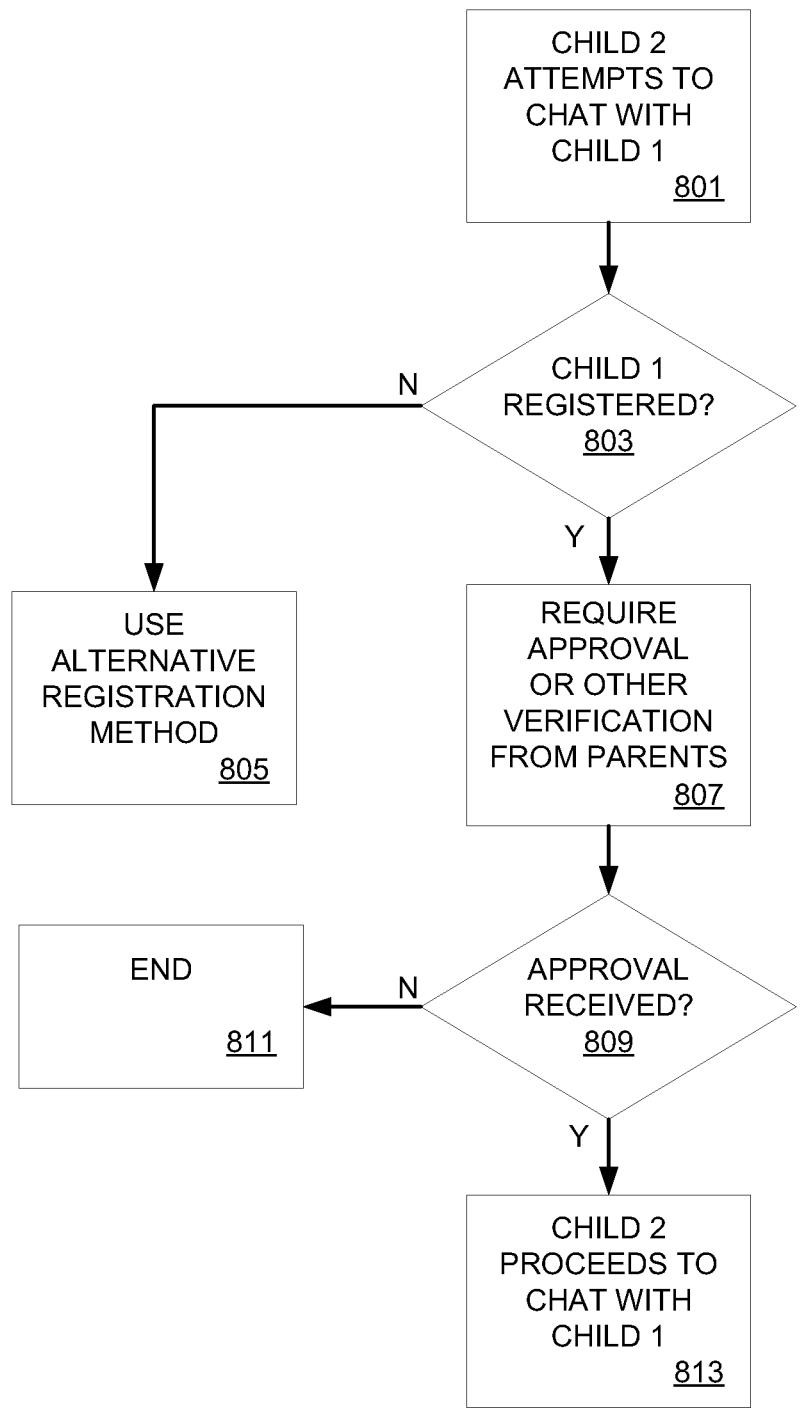
FIG. 8 is a flowchart illustrating an alternative method for communication authorization, according to another exemplary embodiment.

With reference to FIG. 8, another exemplary method 800 for communication authorization may be performed, at least in part, by the first child machine 102 or the authentication provider machine 112 of the system 100 (see FIG. 1), or may otherwise be performed. In the exemplary method 800, a second child attempts to communicate 801 with a first child. The second child may, for example, click on a "click-to-chat button" in an attempt to initiate communications with the first child. The attempted communication is intercepted by the system 100. A determination is made 803 whether the first child has already obtained a confirmation acceptance code, as described above. If the first child does not already have a confirmation acceptance code, the second child is instructed 805 to use an alternative registration method, such as one of the confirmation procedures defined above. Alternatively or in addition, the first child may also be instructed on how to obtain a confirmation acceptance code.

If the first child already has a confirmation acceptance code, an action is initiated 807 by the system (e.g., by the electronic communication provider machine 110 or the authentication provider machine 112 of FIG. 1), to notify at least one of the parents of the second child that either an approval (e.g., a simple approval response via e-mail) or other verification is required for the second child to chat with the first child. The verification can be, for example, a credit card number or another type of determinable consideration that approval from at least one parent has been provided.

A determination is made 809 whether an appropriate approval has been received. If not, the communications is either not allowed or is otherwise terminated 811. However, if the appropriate approval has been received, the second child is allowed to chat 813 with the first child.

Figure 9:
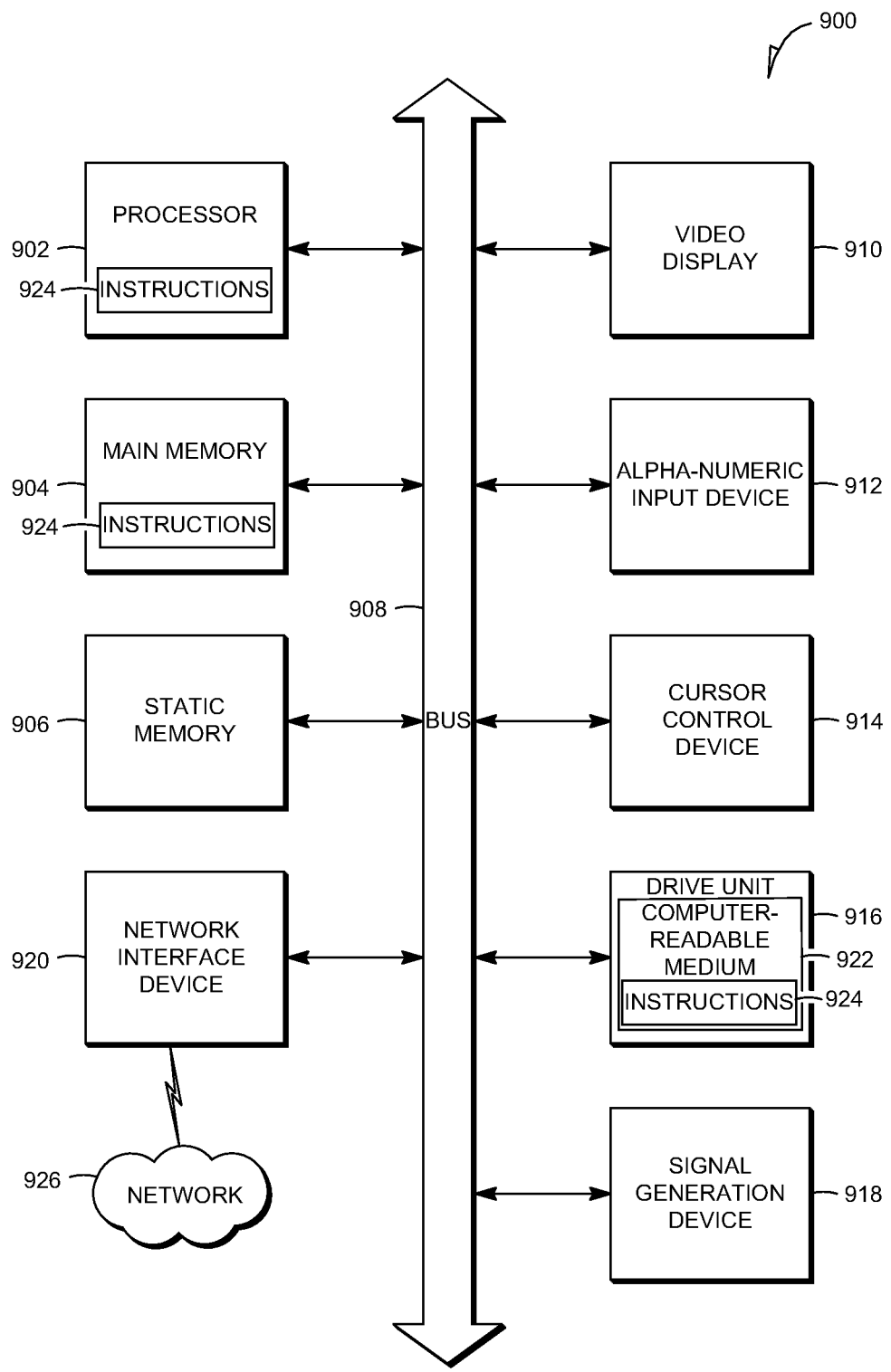
FIG. 9 is a block diagram of a machine in the exemplary form of a computer system within which a set of instructions for causing the machine to perform any one or more of the methodologies discussed herein may be executed.

FIG. 9 shows a block diagram of a machine in the exemplary form of a computer system 900 within which a set of instructions may be executed causing the machine to perform any one or more of the methods, processes, operations, or methodologies discussed herein. The electronic communication provider machine 110, the authentication provider machine 112, or both may operate on one or more computer systems 900. The child machines 102, 106 or the parental representative machines 108 of FIG. 1 may include the functionality of the one or more computer systems 900.

In an exemplary embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, a kiosk, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processor 902 (e.g., a central processing unit (CPU) a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a cursor control device 914 (e.g., a mouse), a drive unit 916, a signal generation device 918 (e.g., a speaker) and a network interface device 920.

The drive unit 916 includes a machine-readable storage medium 922 on which is stored one or more sets of instructions (e.g., software 924) embodying any one or more of the methodologies or functions described herein. The software 924 may also reside, completely or at least partially, within the main memory 904 or within the processor 902 during execution thereof by the computer system 900, the main memory 904 and the processor 902 also constituting machine-readable media.

The software 924 may further be transmitted or received over a network 926 via the network interface device 920.

While the machine-readable storage medium 922 is shown in an exemplary embodiment to be a single medium, the term "machine-readable medium" should be taken to include a single medium or multiple media (e.g., a centralized or distributed database, or associated caches and servers) that store the one or more sets of instructions. The term "machine-readable storage medium shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical media, and magnetic media.

Certain systems, apparatus, applications, or processes are described herein as including a number of modules. A module may be a unit of distinct functionality that may be presented in software, hardware, or combinations thereof. When the functionality of a module is performed in any part through software, the module includes a machine-readable storage medium. The modules may be regarded as being communicatively coupled.

The inventive subject matter may be represented in a variety of different embodiments of which there are many possible permutations. In an exemplary embodiment, a communication enablement request may be received to enable electronic communication between a first child and a second child. A confirmation acceptance code may be electronically generated. The confirmation acceptance code may be associated with the first child and the second child. The confirmation acceptance code may be received from a parental representative of the second child. The electronic communications may be enabled between the first child and the second child based on the receiving of the confirmation acceptance code from the parental representative of the second child. In an example, a relationship between a child and a parental representative may be authenticated.

In an exemplary embodiment, a relationship may be authenticated between a child and a parental representative. Authorization may be received from the parental representative for the child to electronically communicate with a communication participant. An authorization notification for electronic communications between the child and the communication participant may be provided to an electronic communication provider based on the receiving of the authorization.

Thus, methods and systems for child authentication have been described. Although embodiments of the present invention have been described with reference to specific exemplary embodiments, it will be evident that various modifications and changes may be made to these embodiments without departing from the broader spirit and scope of the embodiments of the invention. Moreover, while the various embodiments stated herein are described in terms of children and a parent of at least one of the children, relationships other than parent-child are envisioned. For example, any minor or supervised entity may have electronic communications enabled by a representative thus acting as a supervising entity. The supervised entities can include, for example, disabled or handicapped individuals, prisoners, or any other person whose access to electronic communications may be restricted. The representative might then include anyone in, for example, a supervisory, fiduciary, or caretaking role for the supervised entity. Accordingly, the specification and drawings are to be regarded in an illustrative rather than a restrictive sense.

It should be noted that the methods described herein do not have to be executed in the order described, or in any particular order. Moreover, various activities described with respect to the methods identified herein can be executed in serial or parallel fashion. Additionally, it will be understood that although "End" operations are shown in the flowcharts, the methods may be performed continuously.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus the following claims are hereby incorporated into the Detailed Description, with each claim standing on its own as a separate embodiment.

What is claimed is:

1. A method comprising:
   receiving a communication enablement request to enable electronic communication between a first child and a second child;
   electronically generating, by a server, a confirmation acceptance code;
      associating the confirmation acceptance code with the first child and the second child, the associating enabling a parental representative to specifically authorize the electronic communication between the first child and the second child;
   receiving the confirmation acceptance code from a parental representative of the second child; and
   enabling the electronic communication between the first child and the second child based on the receiving of the confirmation acceptance code from the parental representative of the second child.

2. The method of claim 1, wherein the receiving of the communication enablement request comprises receiving the communication enablement request to enable the electronic communication between the first child and the second child from a parental representative of the first child.

3. The method of claim 1, further comprising:
   transmitting a first child request to a parental representative of the first child in response to the receiving of the communication enablement request; and
   receiving a first child approval from the parental representative of the first child, the electronically generating the confirmation acceptance code being in response to the receiving of the first child approval.

4. The method of claim 1, further comprising providing a confirmation acceptance request including the confirmation acceptance code to the parental representative of the second child, the receiving of the confirmation acceptance code being in response to the transmitting of the confirmation acceptance request to the parental representative of the second child.

5. The method of claim 4, further comprising providing the confirmation acceptance request in hard copy, electronically, audibly, or in combinations thereof.

6. The method of claim 1, further comprising authenticating a relationship between the second child and the parental representative of the second child.

7. The method of claim 1, further comprising transmitting a confirmation acceptance request including the confirmation acceptance code to the second child, the second child being capable of transmitting the confirmation acceptance request to the parental representative of the second child, the receiving of the confirmation acceptance code being in response to the transmitting of the confirmation acceptance request to the second child.

8. The method of claim 1, further comprising:
   generating an additional confirmation acceptance code in response to the receiving of the confirmation acceptance code from the parental representative of the second child; and
   receiving the additional confirmation acceptance code from a parental representative of the first child, the enabling of the electronic communication between the first child and the second child being based on the receiving of the confirmation acceptance code from the parental representative of the second child and the parental representative of the first child.

9. The method of claim 1, wherein the enabling of the electronic communication comprises transmitting an electronic communication notification to an electronic communication provider based on the receiving of the confirmation acceptance code from the parental representative of the second child, the electronic communication notification including identification of the first child and the second child, and the electronic communication provider processing the electronic communication between the first child and the second child.

10. The method of claim 1, wherein the electronic communication includes instant messaging, text messaging, website content access, blog content access, user status information, or combinations thereof.

11. A method comprising:
   receiving a communication enablement request from a representative of a communication participant to enable the electronic communication between a supervised entity and the communication participant
   authenticating a relationship between the supervised entity and a representative of the supervised entity;
   requesting authorization from the representative of the supervised entity;

receiving an authorization from the representative of the supervised entity allowing the supervised entity to electronically communicate with a communication participant, the receiving of the authorization from the representative for the supervised entity being in response to the requesting of the authorization; and transmitting a notification of the authorization for electronic communication between the supervised entity and the communication participant to an electronic communication provider based on the receiving of the authorization, the notification generated by a server and the electronic communication provider configured to process the electronic communication between the supervised entity and the communication participant.

12. The method of claim 11, wherein the authorization includes a communication permission attribute, the communication permission attribute defining an attribute of the electronic communication to be enabled.

13. The method of claim 12, wherein the communication permission attribute includes a number of messages, a message type, an attachment type, an electronic communication type, or combinations thereof.

14. A system comprising:
at least one computer processor and computer storage configured to execute:
a request receiver module to receive a communication enablement request to enable electronic communication between a first child and a second child;
a code generation module at a server to electronically generate a confirmation acceptance code;
a code association module to associate the confirmation acceptance code generated by the code generation module with the first child and the second child, the associating enabling a parental representative to specifically authorize the electronic communication between the first child and the second child;
a second child approval module to receive the confirmation acceptance code from a parental representative of the second child; and
a communication enablement module to enable the electronic communication between the first child and the second child based on the receiving of the confirmation acceptance code by the second child approval module from the parental representative of the second child.

15. The system of claim 14, wherein the confirmation acceptance code is a unique identifier.

16. The system of claim 14, wherein the communication enablement request includes identification of a type of the electronic communication to be allowed between the first child and the second child.

17. One or more machine-readable hardware storage devices comprising instructions, which when executed by one or more processors, cause the one or more processors to perform operations comprising:
receive a communication enablement request to enable electronic communication between a first child and a second child;
electronically generate, by a server, a confirmation acceptance code;
associate the confirmation code with the first child and the second child, the associating enabling a parental representative to specifically authorize the electronic communication between the first child and the second child;
receive the confirmation acceptance code from a parental representative of the second child; and
enable the electronic communication between the first child and the second child based on the receiving of the confirmation acceptance code from the parental representative of the second child.

18. The one or more machine-readable hardware storage devices of claim 17, wherein the one or more processors are further caused to perform operations comprising:
generating an additional confirmation acceptance code in response to the receiving of the confirmation acceptance code from the parental representative of the second child; and
receiving the additional confirmation acceptance code from a parental representative of the first child, the enabling of the electronic communication between the first child and the second child is based on the receiving of the confirmation acceptance code from the parental representative of the second child and the parental representative of the first child.

19. One or more machine-readable hardware storage devices comprising instructions, which when executed by one or more processors, cause the one or more processors to perform operations comprising:
receiving a communication enablement request from a representative of a communication participant to enable an electronic communication between a child and the communication participant;
authenticating a relationship between the child and a parental representative;
requesting authorization from the parental representative;
receiving an authorization from the parental representative for the child to electronically communicate with the communication participant, the receiving of the authorization from the parental representative entity being in response to the requesting of the authorization; and
transmitting a notification of the authorization for the electronic communication between the child and the communication participant to an electronic communication provider based on the receiving of the authorization, the notification generated by a server and the electronic communication provider configured to process the electronic communication between the supervised entity and the communication participant.

20. The one or more machine-readable hardware storage devices of claim 19, wherein the one or more processors are further caused to perform operations comprising receiving a communication permission attribute from the parental representative for the child, the communication permission attribute defining an attribute of the electronic communication to be enabled.

21. One or more machine-readable hardware storage devices comprising instructions, which when executed by one or more processors, cause the one or more processors to perform operations comprising:
receiving a communication enablement request from a representative of a communication participant to enable the electronic communication between a supervised entity and the communication participant
authenticating a relationship between the supervised entity and a representative of the supervised entity;
requesting authorization from the representative of the supervised entity;
receiving an authorization from the representative of the supervised entity for the supervised entity to electronically communicate with a communication participant, the receiving of the authorization from the representative for the supervised entity being in response to the requesting of the authorization; and
transmitting a notification of the authorization for electronic communication between the supervised entity and the communication participant to an electronic communication provider based on the receiving of the authorization, the notification generated by a server and the electronic communication provider configured to process the electronic communication between the supervised entity and the communication participant.

22. A system to enable electronic communications between a plurality of entities, the system comprising:
one or more computer processor and computer storage configured to execute:
a request receiver module to receive a communication enablement request to enable the electronic communication between a first child and a second child;
a code generation module to electronically generate a confirmation acceptance code;
a code association module at a server to associate the confirmation acceptance code generated by the code generation module with the first child and the second child, the associating enabling a parental representative to specifically authorize the electronic communication between the first child and the second child;
a second child approval module to receive the confirmation acceptance code from a parental representative of the second child; and
a communication enablement module to enable the electronic communication between the first child and the second child based on the receiving of the confirmation acceptance code by the second child approval module from the parental representative of the second child.

* * * * *